(12) United States Patent
Nunn

(10) Patent No.: US 9,260,351 B2
(45) Date of Patent: Feb. 16, 2016

(54) PROCESS, APPARATUS AND SYSTEM FOR TREATMENT OF ANIMAL EFFLUENT

(71) Applicant: Garry Robert Nunn, Beaconsfield (AU)

(72) Inventor: Garry Robert Nunn, Beaconsfield (AU)

( * ) Notice: Subject to any disclaimer, the term of this patent is extended or adjusted under 35 U.S.C. 154(b) by 0 days.

(21) Appl. No.: 14/364,526

(22) PCT Filed: Dec. 10, 2012

(86) PCT No.: PCT/AU2012/001508
§ 371 (c)(1),
(2) Date: Jun. 11, 2014

(87) PCT Pub. No.: WO2013/086561
PCT Pub. Date: Jun. 20, 2013

(65) Prior Publication Data
US 2014/0338411 A1    Nov. 20, 2014

(30) Foreign Application Priority Data
Dec. 12, 2011   (AU) ............................... 2011905167

(51) Int. Cl.
| | | |
|---|---|---|
| *C05F 3/00* | (2006.01) | |
| *C05F 17/00* | (2006.01) | |
| *C05F 3/06* | (2006.01) | |
| *A01C 3/00* | (2006.01) | |
| *C05F 17/02* | (2006.01) | |

(52) U.S. Cl.
CPC ... *C05F 3/00* (2013.01); *A01C 3/00* (2013.01); *C05F 3/06* (2013.01); *C05F 17/00* (2013.01); *C05F 17/0027* (2013.01); *C05F 17/0036* (2013.01); *C05F 17/0247* (2013.01); *Y02W 30/43* (2015.05); *Y02W 30/47* (2015.05)

(58) Field of Classification Search
CPC .................................. C05F 3/00; C05F 17/00
USPC ........................................................ 71/9, 64.1
See application file for complete search history.

(56) References Cited

U.S. PATENT DOCUMENTS

| | | | |
|---|---|---|---|
| 2,875,151 A | | 2/1959 | Davidson |
| 2,878,112 A | * | 3/1959 | Morrison ............................ 71/9 |
| 4,226,832 A | * | 10/1980 | Roumens ................... 435/290.4 |
| 4,249,929 A | * | 2/1981 | Kneer ................................ 71/9 |
| 4,565,552 A | | 1/1986 | Cotton |

(Continued)

FOREIGN PATENT DOCUMENTS

| | | |
|---|---|---|
| AD | 600682 A | 4/1948 |
| DE | 10114740 A1 | 9/2002 |

(Continued)

OTHER PUBLICATIONS

International Search Report issued in related PCT Application PCT/AU2012/001508 dated Mar. 22, 2013.

(Continued)

*Primary Examiner* — Wayne Langel
(74) *Attorney, Agent, or Firm* — Marshall, Gerstein & Borun LLP

(57) ABSTRACT

A process of preparing a microbe digested liquid plant nutrient containing metabolites, amino acids and polypeptides, comprising the steps of partial composting of animal effluent solids; adding the partially composted animal effluent to a vessel containing water and held in suspension; the aqueous dispersion is thoroughly aerated for up to 4 days. Solids and liquids are subsequently removed from the metabolic reactor, separated and used as plant nutrients.

18 Claims, 2 Drawing Sheets

(56) References Cited

U.S. PATENT DOCUMENTS

Figure 1:
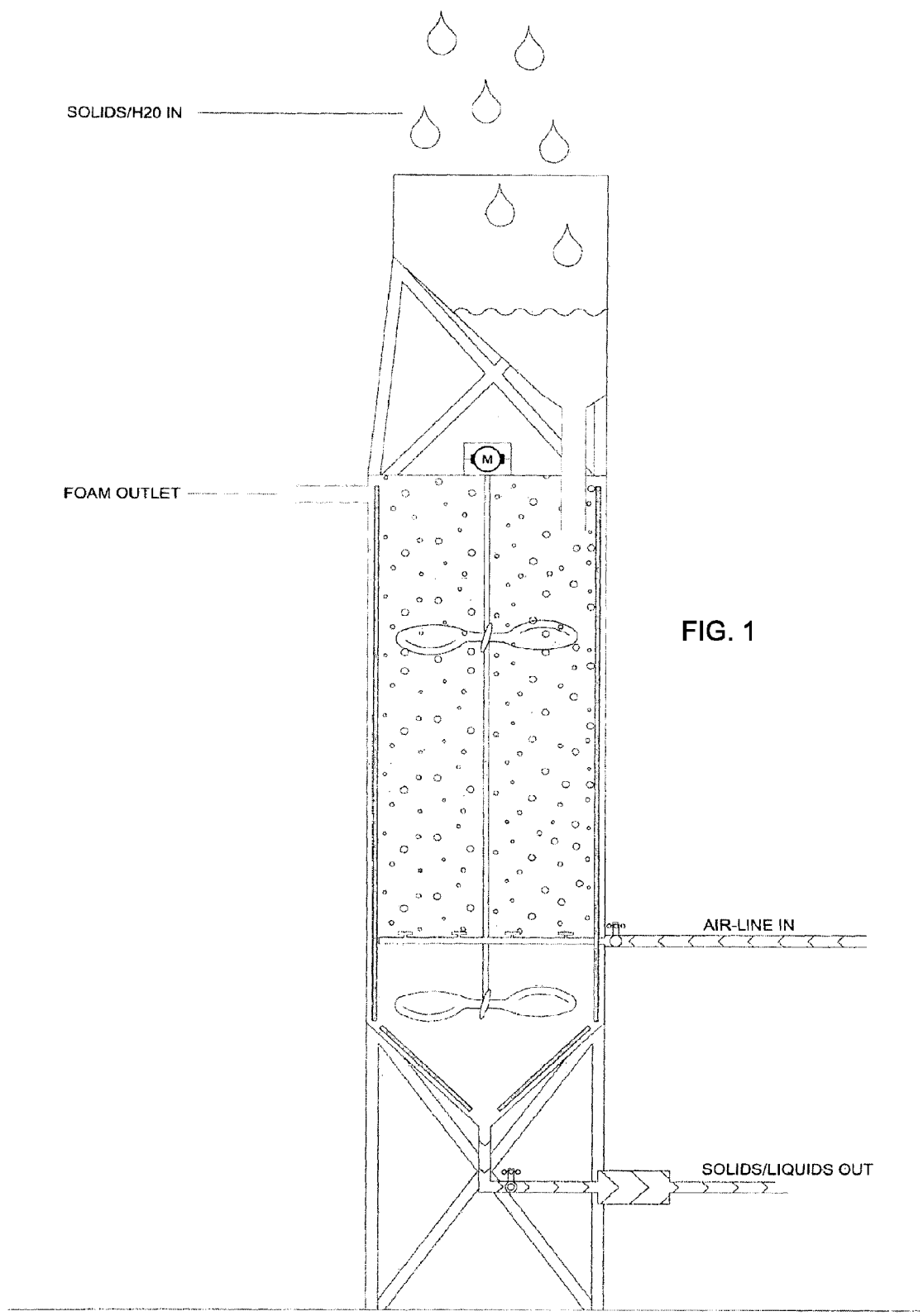

| | | | |
|---|---|---|---|
| 5,158,593 A | 10/1992 | DeLima | |
| 5,432,088 A * | 7/1995 | Kakuk et al. | 435/290.1 |
| 6,637,152 B1 | 10/2003 | Nunn | |
| 7,211,429 B1 * | 5/2007 | Rudas | 435/262 |
| 2004/0016274 A1 * | 1/2004 | Rudas | 71/9 |
| 2009/0107913 A1 * | 4/2009 | Johnson | 210/604 |
| 2010/0010089 A1 | 1/2010 | Van Dyke et al. | |

FOREIGN PATENT DOCUMENTS

| | | | |
|---|---|---|---|
| EP | 0142473 | A2 | 5/1985 |
| FR | 2288719 | A1 | 5/1976 |
| FR | 2924441 | A1 | 6/2009 |

OTHER PUBLICATIONS

Written Opinion of the International Searching Authority issued in related PCT Application PCT/AU2012/001508 dated Mar. 22, 2013.

International Preliminary Report on Patentability issued in related PCT Application No. PCT/AU2012/001508 dated Nov. 27, 2013.

Extended European Search Report issued in related European Application No. 12856894 dated Jul. 16, 2015.

\* cited by examiner

PROCESS, APPARATUS AND SYSTEM FOR TREATMENT OF ANIMAL EFFLUENT

FIELD

The present invention relates to a process, apparatus and system for treatment of animal manure. In particular, the present invention relates to a process, apparatus and system for converting animal manure to a Liquid complete aerobically microbe digested amino acid based fertiliser, having the properties of high electron donation with redox potential between −100 mV and −1000 mV, Electrical Conductivity between 5 mS/cm and 100 mS/cm having many negatively active reactive sites and a solid compost-like by-product.

BACKGROUND

Manure effluent from farm animals and humans is a significant cause of environmental pollution in regard to the leaching of nutrients into water ways and ground water. Particularly hazardous to the environment are nitrates and phosphates which kill fish and cause algal blooms as well as rendering the water too toxic for human and animal consumption. Disposal of these manures also causes release of offensive odours, promotes fly breeding, and releases toxic levels of pathogenic bacteria into soil and water.

A major health concern for animals and humans is the release of viable antibiotics into soils and waterways by the disposal of effluent from humans and animals which have ingested antibiotics. The use of antibiotics is widespread and common in intensive livestock operations. The resident bacteria (including micro-organisms) diverse populations in the soil and water that are exposed to antibiotics rapidly develop antibiotic resistant strains. These resident naturally occurring bacteria can also harvest Deoxyribonucleic acids (DNA) from dead bacteria which have been exposed to antibiotics and construct antibiotic resistant strains of bacteria. These antibiotic resistant bacteria then extend throughout the environment and food chain, replicating and increasing in population density and displacing the less harmful antibiotic sensitive species. If there is continued exposure of soil and water borne bacteria and micro-organisms to antibiotics or the DNA of dead bacteria or dead micro-organisms, the percentage of bacteria or micro-organisms with antibiotic resistant characteristics will reach a threshold where there is a population explosion. If this happens then antibiotics will be useless as a tool to prevent disease and infections in humans and animals which could lead to a world wide pandemic. There is already strains of antibiotic resistant staphylococci bacteria (commonly known as Golden Staph) resident in hospitals where it is proving difficult to remove.

The present invention seeks to overcome at least some of the above mentioned disadvantages.

SUMMARY

In its broadest aspect, the invention provides a process, apparatus and system for the treatment of animal effluent.

Accordingly, in a first aspect, the present invention provides a process for treating animal effluent comprising the steps of:

a) subjecting the animal and human manures to conditions under which at least partial aerobic digestion of the animal effluent is effected in the solid state. A form of carbon suitable for microbe digestion must be present in the stockpile of manure at a ratio of between 40% carbon to 60% manure and 60% carbon and 40% manure. The carbon can be, but not restricted to, sawdust, straw, wood pulp or algae;

b) moisture levels in the compost pile must be maintained at between 40% and 60% moisture. The pile must be turned from 2 to 10 times over a period of 1 week to 2 months, to aerate the mass to enable microbe breakdown of proteins, carbohydrates and carbon. Alternatively, the compost is turned with a compost turner, which is faster.

c) The temperature in the pile is maintained between 60 degrees C. and 85 degrees C. for a period of at least 1 week.

d) At the point of solid composting whereby large amounts of ammonia, sugars, polysaccharides, amines, aldehydes, carboxylic acids, reduced sulphurs and VOC's are produced, then the composting pile is sealed under anaerobic conditions to prevent the aerobic composting process from continuing to the fully composted stage. At the fully composted stage of the solids fraction, ammonia has dissipated, the sugars have been converted to $CO_2$ and microbe activity is vastly diminished. The fully composted solids are not suitable for the subsequent liquid composting stage. The partially composted solids are held in a sealed stockpile under anaerobic conditions to maintain the qualities described in 20 d) above. This static covered stockpile can be held indefinitely for effective feedstock for microbe digestion, but the preferred method is to use the product within 2 years of static anaerobic stockpiling and covered with impervious sheeting to seal gasses in the pile. Excess gas can be vented off.

e) The pile is not allowed to continue in the composting process in the solid state once sugars, saccharides and ammonia is detected. This is effectively semi-composting the manure carbon source to provide the ideal forms of elements suitable for the liquid aerobic composting stage. This provides high levels of active microbe populations present naturally in the pile, along with the precise forms of elements described above, to complete the microbe digestion process in the final liquid aerated composting stage. If the solids composting process, pre-liquid microbe digestion, is allowed to proceed to a stage whereby ammonia is no longer produced and the sugars and saccharides have been converted into $CO_2$, then the liquid stage composting will not be effective. It is vital for the liquid microbe digest feedstock to be sourced at the point of peak microbe and fungus activity, which is half way through a complete composting process. At this point the saccharides, MethylEthylKetones, ethylamines, isopropyl amines, reduced sulphur, Thiophene, propionaldehyde, butrylaldehyde, acetone, amines, carboxylic acids, VOC, aldehydes, sugars, ammonia levels are at the highest, as is the level of microbe and fungus activity and heat generation. The pre-conditioned liquid microbe digest feedstock must be kept sealed once the precise point of maximum microbe and fungus activity has been reached. Most of the composting process, according to this invention, occurs in the liquid aerobic stage whereby the solids are held in suspension and aerated. The pre-conditioning phase is to convert the raw materials, mineral and organic, into a form which is easily digested by microbes in the liquid digester.

f) dispersing a solid digestate produced in steps a) to f) in an aqueous medium; see FIG. 1 g) aerating the aqueous dispersion of step b) in the presence of soluble silica and/or germanium; and h) separating solids from liquids after the aerated aqueous dispersion has been fully microbe and fungus digested, which can be a period of between 4 hours and 3 days. See FIG. 2

In one embodiment of the invention, the animal effluent is mixed with a cellulosic material in a weight ratio (% w/w) of 40:60 to 60:40 animal effluent:cellulosic material prior to subjecting the animal effluent to anaerobic and or aerobic conditions. Preferably, the moisture content of the mixture is in a range of about 40 to 70% w/w.

In another embodiment, subjecting the animal effluent to conditions under which anaerobic and/or aerobic digestion of the animal effluent is effected comprises storing the mixture of animal effluent and cellulosic material in the presence of oxygen for a period of at least 2 weeks. Preferably, the mixture will attain a temperature in a range of about 60° C. to about 85° C. under said conditions.

In a further embodiment, the process comprises treating the cellulosic material with a surfactant. Preferably, the cellulosic material has a moisture content of between 40% and 70% In one form of the invention the treating the cellulosic material with a surfactant involves mixing the surfactant in an amount of 0.5 liters to 5 liters surfactant per tonne of cellulosic material. The mixture of cellulosic material and surfactant may be formed prior to mixing the cellulosic material with the animal effluent. Preferably, the cellulosic material and surfactant mixture is subjected to aerobic conditions for a period of at least one week prior to mixing the treated cellulosic material with the animal effluent. Alternatively, the surfactant may be mixed with the cellulosic material at or around the same time as it is mixed with the animal effluent.

Subjecting the animal effluent to conditions under which aerobic digestion of the animal effluent is effected, as described above, produces a solid digestate.

In one embodiment of the invention the step of dispersing the solid digestate in an aqueous medium comprises mixing the solid digestate with water or an aqueous solution in a weight/volume ratio in a range of 1 kg of solid digestate to about 5 to 50 liters water or aqueous solution.

In a preferred embodiment of the invention, the aqueous dispersion of the solid digestate further comprises one or more additives selected from a group comprising surfactants, aerobic microbial innoculants or precursors thereof, soluble silica and/or germanium, a nitrogen source, such as urea, soluble seaweed, sugar, minerals and molasses. Particularly preferred additives are soluble silica and/or germanium. The one or more additives may be added at or around the same time as the solid digestate is mixed with water or the aqueous solution. Alternatively, the one or more additives may be added to the aqueous dispersion. Conversely, the one or more additives may be added to the solid digestate before it is mixed with water or the aqueous solution. In yet another alternative form of the invention, the aqueous solution may contain the one or more additives prior to mixing with the solid digestate.

In another embodiment, the step of aerating the aqueous dispersion comprises passing an aerating medium at a positive pressure through the entire aqueous dispersion at a rate in the range of 0.5 m$^3$ to 5.0 m$^3$ oxygen containing gas per 100 L water per hour. In one form of the invention the step of aerating the aqueous dispersion is performed for a period of up to 4 days.

Generally, the aerating medium is an oxygen containing gas. Suitable examples of an oxygen containing gas include, but are not limited to, air and oxygen gas.

After the aeration period is complete the solids in the aerated aqueous dispersion are typically allowed to settle under gravity to facilitate separation of the solid and liquid phases by any one of several well known and understood separation techniques.

In a second aspect, the invention provides an apparatus for treating animal effluent comprising a cone bottom vessel for containing an aqueous dispersion of a solid digestate, or semi-composted manures wherein the solid digestate is held in suspension by way of 2 downward thrusting propellers with between 2 and 10 evenly spaced baffles protruding from the vessel walls vertically, with 4 baffles being the preferred number. The baffles prevent a swirling action and this causes the solids to be continually lifted upwards along the vessel walls, effectively holding the solids in suspension. A commercially available aeration dispersal system is placed towards the bottom of the vessel, facing upwards. Air, with or without added oxygen, is pumped through the air dispersal units, creating a mass of bubbles ranging from 0.2 mm to 10 mm in diameter through the entire volume of the vessel with the rotating propellers holding the solid digestate/semi-compost in suspension in the aeration zone. This allows for a high level of surface area contact between the solid digestate, minerals, water, air, oxygen, additives in solution or suspension and beneficial microbes, beneficial bacteria and beneficial fungi. This high level of surface area contact provides the ideal environment for the bacteria to digest the semi-composted manures, replicating and creating a potent solution of metabolites. This process is completed within 48 hours, with the intensity of the microbe digestion heating the water up to a temperature of 80 degrees centigrade. The metabolites have properties of pH between pH 7.5 and pH 11, with preferred pH of pH 9.2, redox of between −200 mV and −800 mV and electrical conductivity between 5 mS/cm and 100 mS/cm. The invention provides the ideal environment for many species of beneficial micro-organisms and beneficial fungi to reproduce and actively digest the pre-conditioned inputs, forming metabolites such as amino-acids, peptides, humic and fulvic acids, RiboNucleic Acids, hemoglobin, produced by aerobically digesting the entire liquid suspension, with the solid inputs held in suspension. The Maximum efficiency of microbe digestion, or metabolite production, is achieved by having the highest surface area contact of the beneficial microbes and beneficial fungi, with water, air and/or oxygen, semi-composted manures, minerals, surfactants, sugars and carbon. For the production of peptides and amino-acids in the liquid composting phase to occur, then the manures must be sourced at the partially composted stage, whereby the peak of heat, sugar and ammonia production by the micro-organism activity is captured for the aerobic liquid composting stage.

In a further embodiment, the discharge outlet is in fluid communication with a separator, wherein the separator is arranged, in use, to separate solids from liquids in the aerated aqueous dispersion.

In a third aspect, the invention provides a system for treating animal effluent comprising:

a source of animal effluent;

an aerobic digester for aerobically digesting the animal effluent. This consists of an aerated pile of manure and carbon. A brix meter is used, to determine sugar levels in the semi-composted heap. When brix levels reach a reading of between 1 and 20, then the solid aerobic composting process is stopped, the stockpile is then sealed and held under anaerobic conditions until it is to be used in the aerobic liquid microbe digestion stage.

a vessel for containing an aqueous dispersion of a solid digestate, wherein the solid digestate is produced by aerobically digesting the animal effluent in the aerobic digester, a separator in fluid communication with the discharge outlet, wherein the separator is arranged, in use, to separate solids from liquids in the aerated aqueous dispersion; and first and second conveyors to transfer the animal effluent from the source of said animal effluent to the aerobic digester, and to transfer the digestate from the aerobic digester to the vessel, respectively.

DESCRIPTION OF THE FIGURES ACCOMPANYING THE DESCRIPTION

Figure 2:
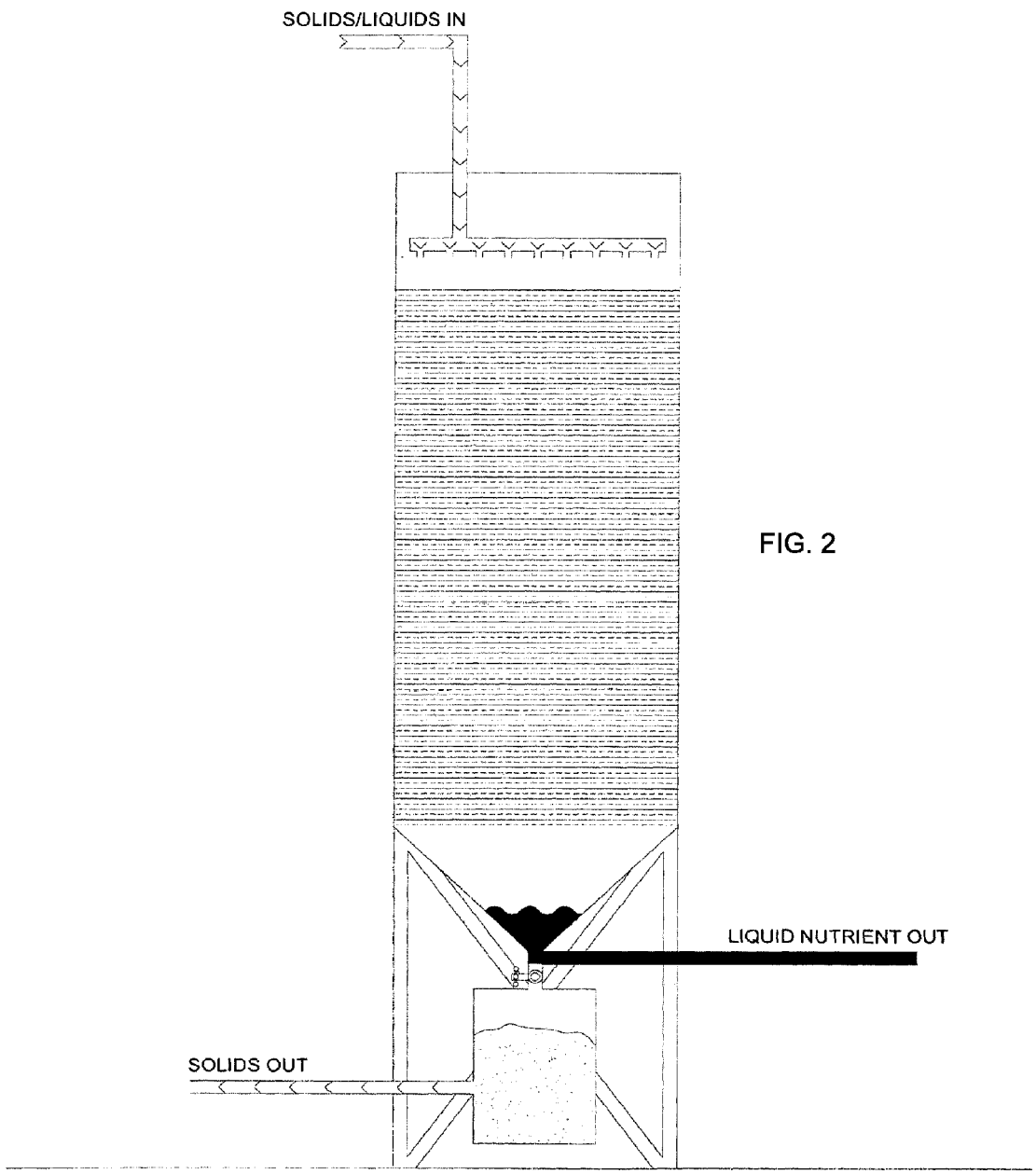

FIG. 1 is a cross-sectional view of an apparatus to treat animal effluent in accordance with the process of the present invention; and FIG. 2 is a cross-sectional view of an alternative apparatus to treat animal effluent in accordance with the process of the present invention.

DETAILED DESCRIPTION OF THE PREFERRED EMBODIMENTS

The present invention relates to a process for treating animal effluent to produce a compost-like solid product and a micro-organism and fungi metabolite liquid fertiliser in the form of amino-acids. The animal effluent first undergoes at least partial aerobic digestion to produce a solid digestate. The term "aerobic digestion" as used herein refers to a process whereby biodegradable material is broken down in the presence of oxygen by aerobic bacteria to produce ammonia and simple sugars and a digestate which may be liquid and/or solid depending on the moisture conditions under which aerobic digestion has been performed. The solid digestate produced in the present invention is then dispersed in an aqueous medium, and the aqueous dispersion is aerated in the presence of soluble silica and/or germanium. The solids and liquids of the aqueous dispersion are then separated into a respective compost-like product and a liquid fertilizer.

In general, the process of the present invention can be used to treat any form of animal effluent to convert it to a compost-like product and a liquid microbe digested fertilizer. Suitable examples of animal effluent include, but are not limited to, human and animal manures, poultry and fish processing wastes, scallop processing residues, algae, and abbatoir effluent. The invention is particularly useful in the treatment of human and animal manures.

Typically, the animal effluent is sourced from agricultural operations, in particular animal feeding operations, such as piggeries, poultry farms, dairies, and stock feedlots. Suitable examples of other agricultural operations include, but are not limited to, abattoirs and food processing operations. Human effluent may also be sourced from municipal operations.

The step of subjecting the animal effluent to conditions under which at least partial aerobic digestion of the animal effluent is effected comprises storing the animal effluent in the presence of oxygen for a period of at least 1 month.

Generally, aerobic digestion of the animal effluent will take place in an aerobic digester. Any aerobic digester may be used in the process of the present invention, and it may be operated as a continuous or batch aerobic digester. The term "aerobic digester" as used herein refers to a device that promotes biochemical decomposition of complex organic, protein and mineral material into ammonia, amines, saccharides and simple sugars. The solid and/or liquid digestate may contain sugars, fatty acids and amino acids as a result of hydrolysis of the proteins and carbohydrates in the complex organic material. Suitable examples of aerobic digesters which can be used in the present invention include, but are not limited to, covered or uncovered heaps.

In one form of the invention, the animal effluent is stored in a static stockpile or heap with a mass of at least 10 tonnes and preferably 100 tonnes. Typically, the static stockpile is covered with an impervious cover, such as a tarpaulin. The purpose of the cover may be two-fold: to minimise ingress of excess water through rainfall into the stockpile and egress of odours and greenhouse gas emissions in the form of biogas or ammonia, and to retain and conserve thermal energy in the stockpile. The cover also inhibits fly breeding, leaching of nutrients by percolation of rainwater through the stockpile, and release of pathogenic bacteria.

In general the animal effluent will attain a temperature in a range of about 60° C. to about 85° C. during aerobic digestion. Advantageously, such temperatures kill pathogenic bacteria and destroy any antibiotics which may be present. Additionally, the inventor opines that nitrogen gases are fixed into the carbon fraction of the solid digestate by mineralisation, thus preventing the loss of this valuable element to the air and also preventing greenhouse gas emissions.

Preferably, the animal effluent is mixed with a cellulosic material in a weight ratio (% w/w) of 40:60 to 60:40 animal effluent:cellulosic material prior to subjecting the animal effluent to aerobic conditions. Suitable examples of cellulosic materials include, but are not limited to, wood, sawdust, plant residues, straw, bagasse, recovered (waste and scrap) paper or paperboard, such as for example unbleached kraft paper or paperboard or corrugated paper or paperboard, paper or paperboard made mainly of mechanical pulp (eg. newspapers, journals and similar printed matter), pulps of fibres derived from recovered (waste or scrap) paper or paperboard or of other fibrous cellulosic material, such as for example, cotton linters pulp, mechanical wood pulp, chemical wood pulp or wood pulp obtained by a combination of mechanical and chemical pulping processes. It will be understood that the wood pulps referred to may be unbleached, coniferous, non-coniferous, semi-bleached or bleached.

Preferably, the moisture content of the animal effluent and cellulosic material mixture is in a range of about 40 to 70% w/w.

The particle size or particle size range of the mixture is not believed to be critical to the invention, although small particle sizes are preferred wherein the surface, area to particle diameter ratio favours increased aerobic digestion rates. Typically, a particle size below 0.5 $cm^3$ is preferred.

The preferred cellulosic material is sawdust. However, sawdust and other wood-derived cellulosic material contain oils and lignins that may inhibit biodegradability and mineralisation of nitrogen and sulphur gases which evolve during aerobic digestion. Accordingly, the process may also comprise treating the cellulosic material with a surfactant. Suitable surfactants include, but are not limited to, ionic surfactants, non-ionic surfactants, and fatty alcohols. Illustrative examples of ionic surfactants include, but are not limited to, anionic surfactants based on sulfate, sulfonate or carboxylate anions such as for example sodium dodecyl sulfate, ammonium lauryl sulfate, and other alkyl sulfate salts, sodium laureth sulfate, alkyl benzene sulfonate, soaps, detergents, or fatty acid salts; cationic surfactants based on quaternary ammonium cations such as for example cetyl trimethylammonium bromide and other alkyltrimethylammonium salts, cetylpyridinium chloride, polyethoxylated tallow amine, benzalkonium chloride, benethonium chloride; and amphoteric surfactants such as for example dodecyl betaine, dodecyl dimethylamine oxide, cocamidopropyl betaine, and coca ampho glycinate. Illustrative examples of non-ionic surfactants include, but are not limited to, alkyl poly(ethylene oxide), copolymers of poly(ethylene oxide) and poly(propylene oxide), alkyl polyglucosides such as for example octyl glucoside and decyl maltoside, fatty alcohols such as cetyl alcohol and oleyl alcohol, and cocamide MEA, cocamide DEA, and cocamide TEA.

Sodium laureth sulfate is the preferred surfactant.

In one form of the invention treating the cellulosic material with a surfactant involves mixing the surfactant in an amount of 0.5 to 5 liters surfactant per tonne of cellulosic material. The mixture of cellulosic material and surfactant may be formed prior to mixing the cellulosic material with the animal effluent. Preferably, the cellulosic material and surfactant mixture is subjected to anaerobic conditions for a period of at least one month prior to mixing the treated cellulosic material with the animal effluent to break down the wood oils and so improve subsequent microbial digestion and enhance nitrogen fixation. Alternatively, the surfactant may be mixed with the cellulosic material at or around the same time as it is mixed with the animal effluent.

Typically, during the at least partial aerobic digestion of the animal effluent, the animal effluent undergoes hydrolysis, whereby the proteins and carbohydrates in the animal effluent are converted into sugars, fatty acids and amino acids in the solid digestate. Advantageously, aerobic digestion of animal effluent as described above results in the fixation of nitrogen and sulphur in the solid digestate in the form of ammonia, nitrates and sulphonates rather than being released as noxious gases which contribute to greenhouse gas emissions.

When aerobic digestion of the animal effluent has reached the peak of ammonia, saccharide and simple sugar production, and before these levels decrease, the process further comprises the step of dispersing this conditioned/semi-composted solid digestate in an aqueous medium. The aerobic digestion of the solid phase is ceased at the point of maximum heat in the pile, and when the presence of sugars, saccharides, ammonia and amines are detected. Generally, dispersing the solid digestate in an aqueous medium takes the form of conveying the solid digestate from the aerobic digester to a vessel and mixing the solid digestate with water or an aqueous solution in a weight/volume ratio in a range of 1 kg of solid digestate to about 2.5 to 50 liters water or aqueous solution.

Preferably, one or more additives selected from a group comprising surfactants, aerobic microbial innoculants beneficial bacteria, or precursors thereof, soluble silica and/or germanium, a nitrogen source, and a microbial energy source, are added to the aqueous dispersion. Particularly preferred additives are soluble silica and/or germanium.

Suitable surfactants comprise those described above.

Suitable aerobic microbial innoculants or precursors thereof will be well known to persons skilled in the art. Illustrative examples include, but are not limited to, commercially available products such as Eco Care supplied by Insight Environmental, Symbex, Environ-8, Eco-Growth. Dose rates for Eco Care are up to 1 ml per 100 liters of solution.

Suitable soluble forms of silica and/or germanium will also be well known to persons skilled in the art. Particularly preferred is a commercially available form of soluble silica marketed under the name of SOLSIL. The soluble silica is comprised in the aqueous dispersion in an amount of between 10 mg to 1 g soluble silica per 1 liter aqueous medium. Without wishing to be bound by theory, the inventor considers that the benefits of the soluble silica are two-fold: 1) it takes part in microbe digestion and is bound into the polypeptide sequences, adding mechanical strength and elasticity to the amino-acids and peptide sequences, and 2) it behaves as a catalyst to accelerate the rate of microbe digestion by virtue of providing a plurality of chemically active sites to facilitate rapid building of long chain amino acids and polypeptide sequences.

Germanium is comprised in the aqueous dispersion in an amount of between 1 μg to 100 μg germanium per 1 liter aqueous medium. It is thought that germanium behaves in a similar, if more potent, fashion to soluble silica and has a key role in boosting the antioxidant levels.

Suitable nitrogen sources include, but are not limited to, urea or seaweed, such as for example the commercially available ARCADIAN, which may be typically present in the aqueous dispersion in an amount between 1 g to 20 g soluble seaweed to 1000 liter aqueous medium. Seaweed is particularly preferred as the nitrogen source, as it also supplies trace minerals such as iodine, chromium, cobalt, vanadium, arsenic and radioactive elements such as uranium and radium, as well as beneficial hormones which stimulate microbial activity. Alternatively, or in conjunction with the addition of seaweed, the aforesaid trace minerals can be added to the aqueous dispersion. In some cases the trace minerals can be sourced from mineral extraction or from industrial wastes.

Suitable microbial energy sources include, but are not limited to, sugar, molasses, starch, maltose, lactose, sucrose, glucose. Microbial energy sources comprise between 250 g to 1000 g microbial energy source per 1000 liters aqueous medium. It is thought that the purpose of the microbial energy source is to increase the carbon fixing ability of the aerobic microbes and to improve polypeptide production.

The one or more additives may be added at or around the same time as the solid digestate is mixed with water or the aqueous solution. Alternatively, the one or more additives may be added to the aqueous dispersion. Conversely, the one or more additives may be added to the solid digestate before it is mixed with water or the aqueous solution. In yet another alternative form of the invention. The aqueous solution may contain the one or more additives prior to mixing with the solid digestate.

The step of aerating the aqueous dispersion in the process of the present invention involves passing an aerating medium at a positive pressure through the aqueous dispersion at a rate in the range of 0.5 $m^3$ to 5.0 $m^3$ oxygen containing gas per 100 L water per hour. In one form of the invention the step of aerating the aqueous dispersion is performed for a period of up to 48 hours. Generally, the aerating medium is an oxygen containing gas. Suitable examples of an oxygen containing gas include, but are not limited to, air and oxygen gas.

After the aeration period is complete the solids in the aerated aqueous dispersion are typically allowed to settle under gravity for approximately 15 to 30 minutes to facilitate separation of the solid and liquid phases by any one of several well known and understood separation techniques. Illustrative examples of suitable separation techniques include, but are not limited to, filtration by vacuum or pressure, centrifugation, dewatering, clarification, vibrating screen separator, wedge wire strainers, and so forth. It will be appreciated that either one or both of the solid and liquid phases may be conveyed to a separate separation device by means of pumping. Typically, the solid phase will be pumped as a slurry. For example the slurry may be pumped out into a drainage bin, with perforated holes at 20 mesh, to drain excess moisture from the slurry to yield a friable potting mix, mulch or remediation agent. Alternatively, the slurry can be pumped through a centrifuge, filter press or dewatering bag for dewatering.

The solid dewatered product may then be stockpiled under cover of a tarpaulin until it is distributed for use as a soil amendment for environmental remediation of soils, or as a potting mix or mulch for improved plant growth.

The separated liquid product of the process may be readily applied as liquid fertiliser in a neat or diluted form. The separated liquid product has redox values of between −50 mV and −1000 mV, and is thought to have a high antioxidant value. Further the conditions under which the liquid product has been produced promote the formation of long chain amino acids and polypeptide sequences which consumes minor trace elements such as silicon, chromium, iodine, vanadium, selenium and germanium.

The above configuration ensures vigorous aeration of the liquid dispersion. Although air is the preferred aerating medium, an aerating medium having an oxygen content greater than air, or pure oxygen may be also be used.

In an alternative embodiment of the invention, the inlets 14 comprise membrane disc diffusers located and fixed at the lower wall 18 of the vessel 12. Typically, the entire surface of the lower wall 18 is covered with said membrane disc diffusers. The hole size in the discs is about 5 micron and produces an air bubble of between 1 mm to 3 mm particle size. This fine bubble takes longer to travel to the surface of the contents of the vessel 12 than larger bubbles and thus increases the microbe access to aeration. The small surface area also increases the microbe/air/digestate/water contact which allows for a more complete and rapid microbe digestion of the aqueous dispersion within the vessel.

The discharge outlet 16 is in fluid communication with a separator (not shown), wherein the separator is arranged, in use, to separate solids from liquids in the aerated aqueous dispersion. The discharge outlet 16 may be configured to remove the liquid phase of the aerated aqueous dispersion after it has been allowed to settle into respective liquid and solid phases. In this particular configuration, the discharge outlet is in fluid communication with a separator such as a filtration device (vacuum or pressure), a centrifugation device, or a tangential flow separator for removal of suspended solid particles therefrom. The resulting liquid may then be readily used as a fertiliser liquid or as an environmental remediation agent for solid, liquid or gas treatments.

In an alternative configuration, the discharge outlet 16 is configured to remove the solid phase of the aerated aqueous dispersion as a slurry. The slurry may be pumped into a drainage bin, such as for example with perforated holes of 20 mesh, to drain excess moisture from the slurry. Alternatively the slurry can be discharged to a centrifuge for dewatering. Other separation techniques will be well known to those skilled in the art and may be readily applied in the separation of the solid and liquid phases of the aerated aqueous dispersion. A further embodiment of the invention for separating the fine solid particles in the range of 150 micron to 5 micron from the nutrient solution is by way of a cone bottom tank with a pipe connected to the base of the cone. See diagram 2. A knife valve is placed at the top of the pipe connected to the cone, and another knife valve positioned at the bottom of the pipe. The upper valve is left open, the lower valve closed. The cone tank and pipe is filled with a dispersion of the microbe digested liquid and the solid fine particulates. The solids are allowed to settle for at least 15 minutes, which reside in the lower pipe section. The upper knife valve is closed and the lower valve opened, with the solid fines removed in a small proportion of the liquid slurry. The action of closing the upper knife valve does not stir up the solid fine particulates and allows for fast and efficient recovery of most of the liquid fraction without the need for costly filtering machinery.

The apparatus 10 of the present invention, as described above, is readily incorporated into a system for treating animal effluent. The apparatus may be located proximal to an aerobic solids digester for aerobically digesting the animal effluent, and the system may be further provided with a first conveyor to transfer the solid digestate from the aerobic digester to the vessel of the apparatus. Similarly, the aerobic digester may be located proximal to a source of animal effluent, and the system may be further provided with a second conveyor to transfer the animal effluent from the source of animal effluent to the aerobic digester.

It is to be understood that, although prior art use and publications may be referred to herein, such reference does not constitute an admission that any of these form a part of the common general knowledge in the art, in Australia or any other country.

For the purposes of this specification it will be clearly understood that the word "comprising" means "including but not limited to", and that the word "comprises" has a corresponding meaning.

Numerous variations and modifications will suggest themselves to persons skilled in the relevant art, in addition to those already described, without departing from the basic inventive concepts. All such variations and modifications are to be considered within the scope of the present invention, the nature of which is to be determined from the foregoing description.

The invention claimed is:

1. A process for treating animal effluent comprising the steps of:
   a) subjecting the animal effluent to conditions under which at least partial aerobic digestion of the animal effluent is effected;
   b) holding a partially aerobic microbe digested solids under anaerobic conditions to maintain the ammonia, sugars and saccharide levels formed at the peak of microbe activity in the solid phase;
   c) sealing of a semi-composted manure produced in step b);
   d) dispersing a solid digestate produced in step b) in an aqueous medium;
   e) aerating the aqueous dispersion of step d) in the presence of soluble silica and/or germanium; and
   f) separating solids from liquids from the aerated aqueous dispersion.

2. The process according to claim 1, wherein the step of c) more specifically comprises holding the solids in a suspension.

3. The process according to claim 1, wherein the animal effluent is mixed with a cellulosic material prior to subjecting the animal effluent to anaerobic conditions and wherein the animal effluent is mixed with the cellulosic material in a weight ratio (% w/w) of 40:60 to 60:40 animal effluent: cellulosic material.

4. The process according to claim 1, wherein the moisture content of the mixture is in a range of about 40 to 70% w/w.

5. The process according to claim 3, wherein subjecting the animal effluent to conditions under which at least partial aerobic digestion of the animal effluent is effected comprises storing the mixture of animal effluent and cellulosic material in the presence of oxygen or an oxygen rich atmosphere for a period of between 1 week and two months.

6. The process according to claim 3, wherein the mixture attains a temperature in a range of about 60° C. to about 85° C. under said conditions.

7. The process according to claim 3, wherein the process comprises treating the cellulosic material with a surfactant and wherein the cellulosic material is mixed with the surfactant in an amount of 0.5 to 5 liters surfactant per tonne of cellulosic material.

8. The process according claim 7, wherein the mixture of cellulosic material and surfactant is formed prior to mixing the cellulosic material with the animal effluent wherein the cellulosic material and surfactant mixture is subjected to aerobic conditions for a period of at least one month prior to mixing the treated cellulosic material with the animal effluent.

9. The process according to claim 7, wherein the surfactant is mixed with the cellulosic material at or around the same time as it is mixed with the animal effluent.

10. The process according to claim 1 wherein the semi-composted manure is then held with carbon under anaerobic conditions to prevent further aerobic breakdown of the sugars and saccharides to form $CO_2$ and dissipation of ammonia.

11. The process according to claim 1, wherein the step of dispersing the solid digestate in an aqueous medium comprises mixing the solid digestate with water or an aqueous solution in a weight/volume ratio in a range of 1 kg of solid digestate to about 2.5 to 50 liters water or aqueous solution.

12. The process according to claim 1, wherein the aqueous dispersion of the solid digestate further comprises one or more additives selected from a group consisting of surfactants, aerobic microbial innoculants or precursors thereof, a nitrogen source, and a microbial energy source.

13. The process according to claim 12, wherein the one or more additives is added at or around the same time as dispersing the solid digestate in the aqueous medium.

14. The process according to claim 12, wherein the one or more additives is added to the aqueous dispersion.

15. The process according to claim 12, wherein the one or more additives is added to the solid digestate before it is mixed with water or the aqueous solution.

16. The process according to claim 12, wherein the aqueous solution contains the one or more additives prior to mixing with the solid digestate.

17. The process according to claim 1, wherein the step of aerating the aqueous dispersion comprises passing an aerating medium at a positive pressure through the aqueous dispersion at a rate in the range of 0.5 $m^3$ to 5.0 $m^3$ aerating medium per 100 L water per hour.

18. The process according to claim 1, wherein the step of aerating the aqueous dispersion is performed for a period of up to 4 days.

* * * * *